Oct. 25, 1966   R. W. COTTERMAN ET AL   3,281,811
NUCLEAR BLAST DETECTOR

Filed Jan. 2, 1963   7 Sheets-Sheet 1

INVENTORS
R.W. COTTERMAN
W.H. WRIGHT
BY
ATTORNEY

United States Patent Office 3,281,811
Patented Oct. 25, 1966

3,281,811
NUCLEAR BLAST DETECTOR
Robert William Cotterman, Fort Wayne, Ind., and Warren H. Wright, Torrance, Calif., assignors to International Telephone and Telegraph Corporation
Filed Jan. 2, 1963, Ser. No. 257,806
5 Claims. (Cl. 340—214)

This invention relates to explosion detectors and more particularly to nuclear blast detectors.

The need for a nuclear blast detector is self-apparent. The uses of such detectors should also be apparent. For example, the detector could close the door of a fall-out shelter or a bank vault, set-off a civil defense alert or start the motor of a launch vehicle; or, it could cause some other desired response. Although this list of possible uses could be multiplied greatly, this specification will, for convenience of expression, refer only to the closing of a door. Of course, all uses are intended to be covered thereby.

The design limitations upon such a blast detector are manyfold. First and most important, a nuclear blast detector should never fail. Its first actual response may perhaps be its only response. Thus, it should be almost continuously self-checking with a foolproof indication of any need for maintenance. Second, the detector should depend upon a phenomenon which occurs responsive to every nuclear blast. Also that phenomenon should be timely and reliably detectable since if the phenomenon occurs and dissipates before the detector can respond, the blast goes undetected. On the other hand, a dependence upon too late an occurring phenomenon may result in extensive damage before the shelter door is closed. Third, the detector should be simple and rugged, designed to withstand much abuse and survive heavy shockwaves or other damage-causing blast reactions. These are, of course, only a few design considerations—those skilled in the art will readily perceive many other considerations also.

We have found that one reliable phenomenon occurring during a nuclear blast results from the thermal signal caused by the nuclear explosion. This thermal signal from the blast is characterized by two-peaks of energy in the ultra-violet, visable, and infrared spectrums. The first peak has a very fast rise-time signal, while the second peak has a slow rise-time signal. The first energy peak occurs simultaneously with a detonation of the nuclear blast. The second peak occurs an instant later. Dependent upon the size of the blast, the period between the two peaks can vary from a few hundred milliseconds to several seconds.

The first thermal pulse contains only approximately 1% of the total thermal energy radiated by the blast. Due to this, reception of the first pulse cannot be absolutely depended upon. Thus, the detector must function if only the second thermal pulse is received. However, since the second thermal pulse reaches its peak much later than the initial pulse, the detector must also receive the initial pulse to obtain a quick response to the detonation of a nuclear blast.

We have also found that another reliable phenomenon occurring during a nuclear blast results from a radiation of a single cycle of electromagnetic waveform. This waveform is characterized by the polarity sense of its two half-cycles and by the time elapsing between the two half-cycles. Thus, the two-half waves might be construed as a binary coded signal and the detector logic may be designed to respond only when the correct binary code is received.

Accordingly, an object of this invention is to provide new and improved blast detectors. In this connection, an object is to provide a foolproof blast detection system. Another object is to provide for immediate detection on a first blast caused thermal pulse with back-up detection on the second thermal pulse.

Yet another object is to provide a blast detection responsive to the electromagnetic radiation caused by said nuclear blast. Here an object is to cause an alarm when the radiation has a predetermined waveform.

A further object of this invention is to provide for an automatic testing of a blast detector. Here an object is to keep a virtually continuous surveillance over the blast detectors and to detect any failures almost immediately upon an occurrence thereof.

In accordance with one aspect of the invention, a blast detector is designed to respond to both the first fast rising thermal pulse and the second slow rising thermal pulse. These pulses are detected by infrared spectrum detectors. The blast detector output is given in response to a combination of the two thermal pulses or to the second, slow rising pulse alone. The detector output is inhibited if only the first, fast rising pulse is received.

In accordance with another aspect of the invention, a blast detector comprises a hardened antenna operates site. Electronic logic circuitry connected to the antenna responsive to a monocycle output signal caused by blast radiation. If a radiated signal has a correct monocycle wave form, an alarm or blast detector output is given.

In accordance with yet another aspect of the invention the blast detector is tested periodically. To accomplish this, an integral timer initiates a series of events including a simulation of the detectable blast caused signal. Just before this simulated signal, a circuit disconnects the output of the detector circuits from the following circuits so that such circuits are not activated by the blast simulating testing signal. Then, test logic circuitry detects the presence of the blast simulating test signal, and determines whether all the necessary functions are performed by the detector equipment. If all such functions are performed, the equipment is automatically restored to normal operation, and a green lamp lights. However, if for any reason, all necessary functions are not performed, the equipment is not restored to normal operating conditions, and a red lamp lights (or another suitable alarm is given).

Regardless of whether thermal or radiation detection is used, two channels of reception should be provided to increase system reliability and to provide detection capability during the test cycle, i.e., while one channel is being tested, the other is capable of detecting a blast.

The above mentioned and other features of this invention and the manner of obtaining them will become more apparent, and the invention itself will be best understood by reference to the following description of an embodiment of the invention taken in conjunction with the accompanying drawings, in which.

THERMAL DETECTOR

Figure 1:
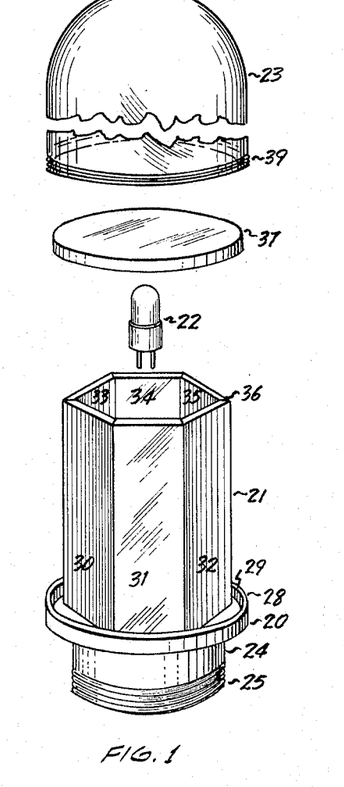
FIG. 1 shows the mechanical details of an infrared sensor.
Figure 2:
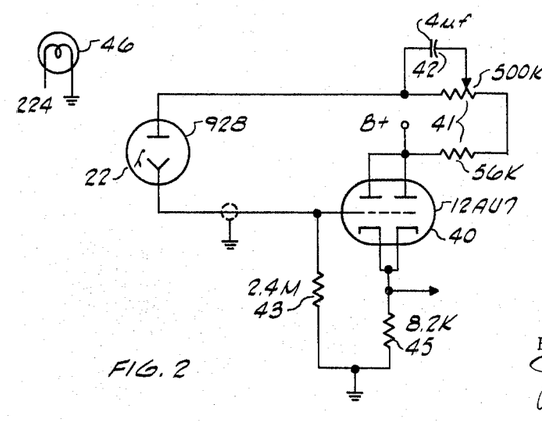
FIG. 2 shows a circuit schematic diagram for the electrical parts of the sensor of FIG. 1.

Throughout this specification, reference is made to an optical sensor for detecting nuclear blasts. The physical parts of an exemplary sensor, such as this, is shown in FIG. 1. The circuitry for the sensor is shown in FIG. 2.

The sensor unit shown in FIG. 1 includes a base plate 20, an infrared filter 21, a photoelectric cell 22, and a housing 23. The base plate is any suitable device such as a cast aluminum piece part, for example. This part is here shown as including a collar 24, threaded at 25, for mounting on a lamp post or other support. The collar depends from and is integral with the base plate 20. An upstanding edge 28 on the base plate has internal threads 29 for securing the housing 23 when it is in position.

The filter 21 includes a number of optically plane sheets 30–35 of filter glass. Preferably each sheet of glass is mitered on two of its edges (as shown at 36) to facilitate assembly into a hexagonal parallelepiped. When so assembled these sheets of glass are cemented into position by any suitable opaque cement—an epoxy resin, for example. After assembly a top sheet of filter glass 37 is cemented into position. The filter glass described thus far preferably has physical characteristics which are transparent only in the optical bandwidth of approximately 7000 to 9000 Angstrom units. In one case a Corning filter 7–69 was used.

The photocell 22 is completely enclosed by the filter 21 so that no unfiltered light can cause an electrical response. Of course, the sensor unit is constructed so that the photocell may be removed and replaced in any suitable way without dismembering the optical filter. In one system the cell 22 was an electron tube, type 928.

Finally, the sensor unit is sealed against the elements by the housing 23. It may be a simple non-filtering, transparent glass globe with a threaded skirt 39 which mate with the threads 29 in the base plate 20. Therefore, the housing is secured into position simply by fitting the housing globe 23 over the filter 21 and turning threads 39 into threads 29.

The electrical sensor circuit FIG. 2 (preferably mounted on base plate 20 and included within the housing globe 23 of FIG. 1) comprises the photoelectric cell 22 and a cathode follower 40. Finally, the sensor includes an incandescent lamp 46 preferably mounted inside the optical filter 21. The sensitivity of the sensor is adjusted at resistor 41 is the presence of the light of lamp 46. The lamp is not lit during normal operations. To demonstrate the design techniques used in one exemplary system, circuit values are shown for the components in FIG. 2. However, other values can be used, and the scope of the invention is in no way limited to these particular values.

Many advantages flow from a use of the described sensor. For one thing, ambient sunlight has a relatively high content of ultraviolet light and a relatively low content of infrared light in the near band. Whereas a nuclear blast has a relatively low content of ultraviolet light and a relatively high content of near infrared light. The sensitivity of the sensor may be adjusted to detect this difference. Lightning discharges have a much higher relative content of near infrared light (as compared to the sun); however, the thermal envelope of a lightning discharge has a very much faster rise time and a broader top than the thermal envelope of a nuclear blast. Again, the sensitivity of the sensor may be adjusted to provide a degree of selectivity between nuclear blasts and lighting. Moreover, associated circuitry may be designed to select pulses having a blast envelope rise time and to reject pulses having a lightning envelope rise time.

Figure 3:
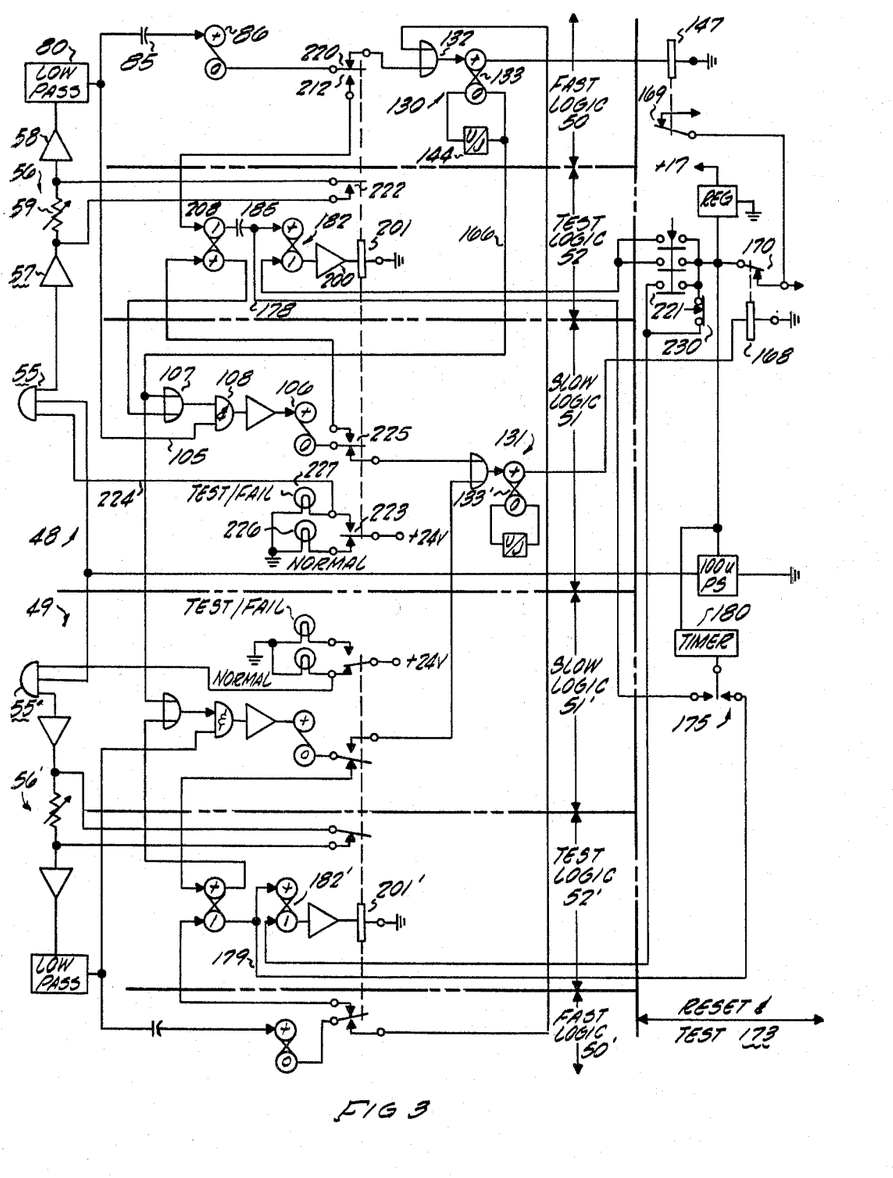
FIG. 3 shows the system logic of a preferred embodiment of an exemplary blast detector relying upon detection of thermal energy.

FIG. 3 shows the logic of a nuclear blast detector. Primarily, this detector includes two channels 48, 49 to provide redundancy and increased reliability in the reception of blast caused signals and further to provide detection capabilities during testing. This is, channel 48 receives while channel 49 is being tested and vice versa. Each channel includes a fast logic trigger circuit 50, 50', a slow logic trigger circuit 51, 51', and a test logic circuit 52, 52'. Moreover, each channel has an individually associated infrared sensor 55, 55' constructed as shown in FIG. 1. Each sensor is connected via its cathode follower to an amplifier-driver 56, 56'.

The amplifier-driver 56 includes a pair of amplifiers 57, 58 separated by a gain control 59. The gain control is set for the desired sensitivity. For example, the control 59 may be set to detect a 20 kiloton blast at a range of 10 miles but not to detect the sun or lightning. Or, it could be set to detect any other suitable blast within a desired range.

Figure 4:
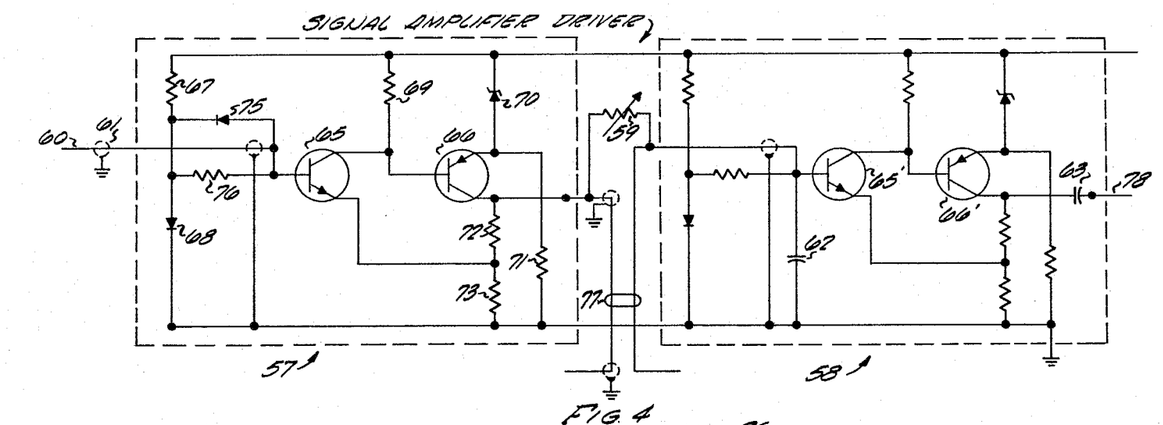
FIG. 4 is a schematic circuit diagram showing a signal amplifier-driver unit for increasing the output power of the sensor or infrared detector of FIG. 1.

The details of an exemplary driver-amplifier are shown in FIG. 4. The input from the sensor 55 is received over conductor 60, which may be a shielded cable, as indicated by the symbol 61. The two amplifiers 57, 58 are identical units except for the capacitors 62, 63. The capacitor 62 is an oscillating suppressing device, and the capacitor 63, a coupling capacitor to an associated electrical filter.

Each amplifier unit 57, 58 includes a feed-back pair of complementary transistors 65, 66 preferably for achieving a desired minimum gain of 10. In one exemplary system, the NPN transistor 65 was a type 2N1302 and the PNP transistor 66 was a type 2N1303. A resistor 67 and diode 68 voltage divider sets the bias for the base of transistor 65. A resistor 69 allows sufficient current to flow through transistor 65 to offset changes due to the $I_{co}$ current. A Zener diode 70 and a resistor 71 limit the emitter to collector voltage on transistor 66. Resistors 72, 73 form a collector load for transistor 66 and also provide a negative feedback resistance for transistor 65. The diode 75 prevents excessive positive signals from damaging the transistor 65, and the resistor 76 limits base current. Caution should be exercised when measuring potentials on transistor 66 for if it is shorted, the transistor 65 will be destroyed.

The bandwidth of the amplifier unit is limited by the capacitor 62 and by stray capacitance. Preferably, this bandwith may be approximately 0.5 to 30,000 c.p.s.

The gain of the driver-amplifier combination is adjusted by the potentiometer 59 connected as a rheostat between the two amplifier stages 57, 58. During testing, the potentiometer 59 is shunter via conductors 77, thus causing the device to always test at maximum sensitivity.

It should now be fairly obvious to those skilled in the art that the output from the sensor 55 is amplified in the circuit of FIG. 4 by an amount determined by the setting of a potentiometer 59. Also, the frequency of the output signal is restricted by the capacitor 63. Therefore, the sensor's output signal, thus modified, appears at output terminal 78.

Figure 5:
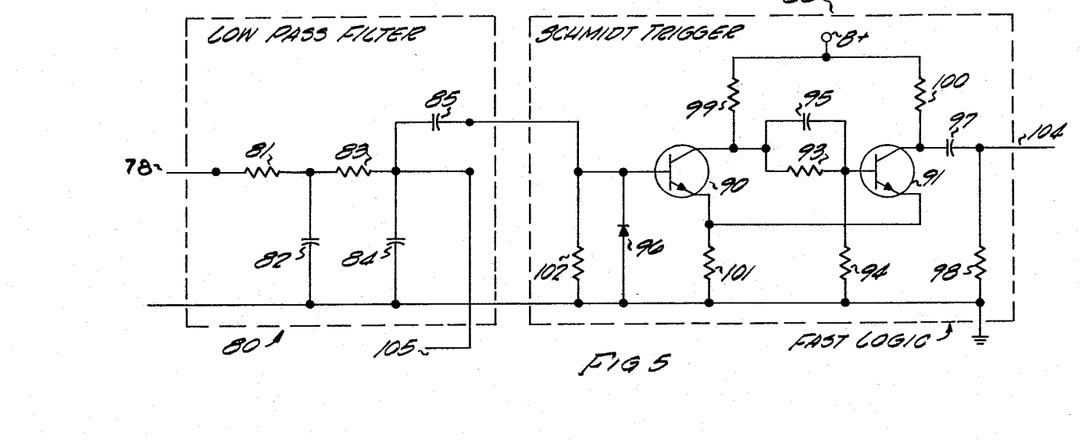
FIG. 5 is a schematic circuit diagram showing a fast trigger logic circuit.

Means are provided for preventing response to ambient changes of sensed signals. For example, ambient infrared signals (or perhaps it should be called "noise") caused by the sun are characterized by changes having an extremely slow rise time. Therefore, the amplifier-driver output terminal 78 is also an input terminal to a low pass filter 80 (FIG. 5). Essentially, this is a low pass filter having two "L" sections, resistor 81, capacitor 82 and resistor 83, capacitor 84. Frequencies above 700 c.p.s. are not passed through the filter. A coupling capacitor 85 prevents very slow rise time signals, such as the change in ambient sunlight, from passing.

Means are provided for detecting the initial, fast rising thermal energy peak caused by a nuclear blast. Essentially, this means 86 includes a fast responding electronic trigger circuit 86 such as the Schmitt trigger and wave forming network shown in FIG. 5. This trigger circuit includes a normally "off" transistor 90 and a normally "on" transistor 91 controlled by resistors 93 and 94. Capacitor 95 bypasses resistor 93 to speed up the switching time of the circuit. The base-to-ground diode 96 prevents large negative signals from damaging the transistor 90. Capacitor 97 and resistor 98 form a differentiating output network to change the flat top output pulse of the Schmitt trigger to a positive spike followed by a negative spike. The remaining components of circuit 86 are a pair of load resistors 99, 100, and a common emitter bias resistor 101. Resistors 81, 83, 102 form a voltage divider for applying signals to the base of transistor 90.

In principle, a Schmitt trigger circuit is a modified multivibrator. The modification utilizes the single emitter supply resistor 101 common to the two transistors 90, 91. Initially transistor 91 is "on" and transistor 90 is "off." A negative voltage on the collector of transistor 91 appears at the emitter of transistor 90 to maintain its "off" condition. Also the voltage applied through the resistors 99, 93 to the base of transistor 91 holds it "on" and in saturation.

Upon the receipt of an input pulse, transistor 90 switches "on" and the base of transistor 91 moves toward ground. The added current through the common emitter resistance 101 changes the relative potentials to speed the cut off of transistor 91. When the input pulse terminates, the process reverses and transistor 90 switches "off" while the transistor 91 switches "on."

Upon reflection, it should be apparent that the initial, fast rising pulse resulting from a nuclear blast causes an output on conductor 104. This output depends upon the rise time of the pulse. That is, the various filter circuits and capacitances eliminate all ambient, sun caused infrared changes and pass only the blast caused pulse. Moreover, the low pass characteristics of filter 80 eliminate lightning caused signals.

Means are provided for detecting the slow rising second pulse resulting from nuclear blasts. This means is shown in general at 51 in FIG. 3 and in detail in FIG. 6. The slow trigger input 105 is taken from the output 105 of filter 80 (FIG. 5). The slow trigger logic is made up of a Schmitt trigger circuit 106, an OR gate 107 and an AND gate 108, a 150 millisecond time constant circuit 110, and a coupling transistor 111. The Schmitt trigger circuit 106 is essentially the same as the already explained Schmitt trigger circuit of FIG. 5. Diodes 112, 113, Zener diode 114 and resistor 115 form OR gate 107. The Zener diode 114 limits the signal voltage coming through diodes 112, 113 to match the voltage coming through a diode 116. Diodes 116, 117 and resistor 118 form the AND gate 108. Diode 119 shorts large negative signals to ground.

Figure 6:
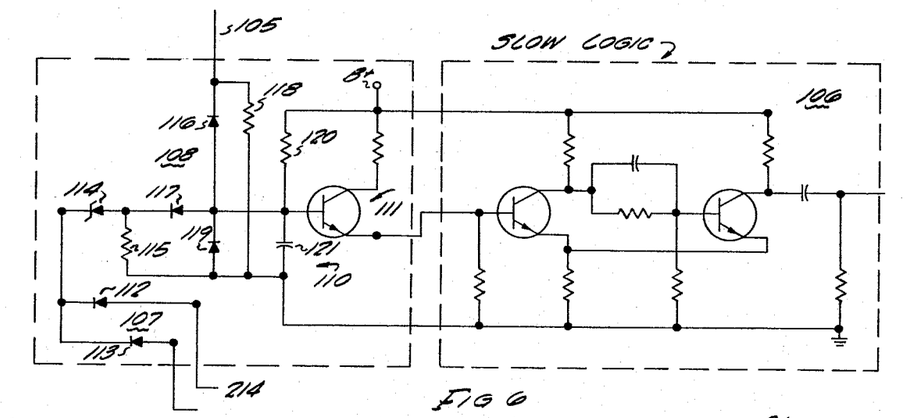
FIG. 6 is a schematic circuit diagram showing a slow trigger logic circuit.

Resistor 120 and capacitor 121 form the delay circuit 110 having a 150 millisecond time constant. The base bias of transistor 111 is normally at a low voltage because of a current flow through resistor 120, diode 117, and resistor 115. When both of the diodes 116, 117 are prevented from conducting by an application of a positive voltage at their cathodes, capacitor 121 charges and an exponentially increasing voltage appears at the base of transistor 111. The time constant of the delay circuit 110 (resistor 118 and capacitor 121) is such that the voltage on the capacitor does not reach a value sufficient to trigger the Schmitt trigger 106 for approximately 50 milliseconds. This provides for the slow rise time of the second thermal pulse.

In passing it should be noted that the fast logic circuit responds to both fast and slow rising thermal pulses. Thus, the circuit responds when the slow rising pulse occurs even if the first pulse is dissipated too fast to be detected. On the other hand, a fast rising pulse alone will not cause a response. In fact, it will be shown that a dissipation of the fast pulse output before the slow pulse occurs removes an input from AND gate 108, thus inhibiting output signals.

Means are provided for giving an output signal responsive to an occurrence of a detected infrared energy pulse, but not responsive to a successful test. This means is shown generally at 130, 131 in FIG. 3 and in detail in FIG. 7. In essence, this figure includes an OR gate 132 and a flip-flop circuit 133.

Figures 7, 11:
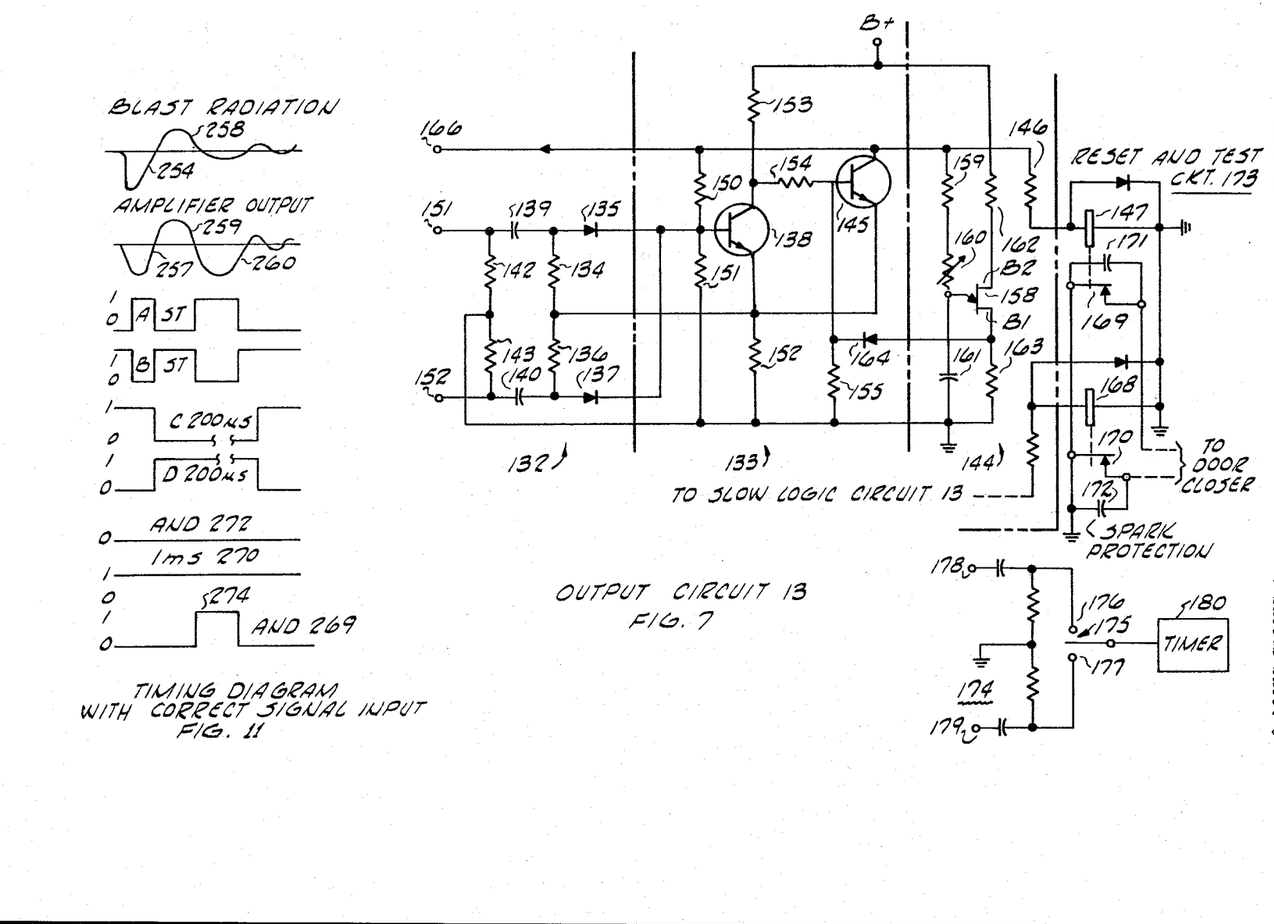
FIG. 7 is a schematic circuit diagram showing details of an output circuit.
FIG. 11 are wave forms illustrating the characteristics of a monocycle wave form and logic operation responsive thereto.

The OR gate 132 is made up of resistor 134, diode 135 and of resistor 136, diode 137. If the anode side of either diode 135, 136 goes positive, the base of an NPN transistor 138 also goes positive to start the flip-flop action. The capacitors 139 and 140 isolate the OR gate 132 from external D.C. circuits. Resistors 142, 143 allow charges to leak off capacitors 139, 140 during the switching of channel disconnect circuit relays.

Next, reference is made to the flip-flop circuit 133 and its unijunction reset circuit 144 of FIG. 3, shown in detail in FIG. 7. The NPN transistors 138, 145 form the flip-flop 133. The collector load of transistor 145 is made up of resistor 146 and the winding of relay 147. The resistor 146 limits the voltage across relay 147 to prevent overvoltage damage. The remaining flip-flop 133 components are a base biasing voltage divider 150, 151, emitter bias and collector load resistors 152, 153 for transistor 138, a coupling resistor 154, and a base biasing resistor 155 for transistor 145. The common emitter bias resistor 152 also supplies both of the transistors 138, 145 to provide a Schmitt trigger action.

Means are provided for automatically resetting the fast logic output flip-flop after a brief period of time. This automatic reset circuit 144 for the flip-flop 133 comprises a unijunction transistor 158. In on exemplary system, a type 2N491 unijunction device was used. Resistors 159, 160 and capacitor 161 form an adjustable time constant circuit in the emitter bias supply of the unijunction transistor 158. When the collector potential of the flip-flop transistor 145 moves toward the B+ supply voltage (due to a postive signal sent through OR gate 132 to the base of transistor 138), the voltage across capacitor 161 and the emitter potential of unijunction transistor 158 start moving toward the B+ supply voltage also. However, the rate of voltage rise is limited by the resistors 159, 160. When the emitter voltage reaches approximately 60% of the voltage on base 32, the transistor 158 conducts, developing a positive spike across resistors 162, 163. (Upon the conduction of unijunction transistor 158, the charge is removed from capacitor 161). This spike is coupled through diode 164 to the base of transistor 145 causing the flip-flop 133 to return to its normal state.

During the interval while transistor 145 conducts, a signal feeds back over conductor 166 to enable the slow logic circuit 51 (FIG. 3). After automatic reset, this feedback signal is removed to inhibit the slow logic by precluding an AND function at gate 108.

The output circuitry of FIG. 7 is repeated for the slow logic channel 51 as shown at 131 in FIG. 3. The slow logic circuitry 131 is identical to that of FIG. 7, the only difference being that the time constant fixed by resistor 159, 160 and capacitor 161 is fixed to take approximately one half second to reach a voltage sufficient to allow the unijunction transistor 158 to conduct.

The flip-flop 133, 133' circuitry (transistor 145 conducting) drives either of a pair of relays 147, 168, depending upon whether the fast logic channel 50 or the slow logic channel 51 is then responding to a detected signal. In either event, a contact 169, 170 opens a circuit to a door closer. These contacts combine to form a NOR circuit;

the door closes when neither contact 169 nor contact 170 are closed. The capacitors 171, 172 provide spark protection to keep contacts 169, 170 from pitting. The resulting door closing (or other) function in a fall-out shelter may be accomplished in any well known manner.

*Test and reset.*—The relays 147, 168 are parts of a reset and test circuit 173 shown generally on the right side of FIGS. 3 and 7. In addition to these relays, circuit 173 includes a pulse forming network 174 to differentiate a pulse generated by placing a "Reset" switch 175 in one of two channel positions 176, 177. The differentiating circuit 174 output 178 connects to a terminal 179 in the channel disconnect circuit of FIG. 8. The terminal 179 makes a similar connection as shown in FIG. 3.

Testing automatically follows after the switch 175 is positioned to select the channel to be tested. The testing is controlled by a timer 180 which includes a D.C. motor that drives two cams, at a rate of one revolution per hour, through a gear train (none of which are shown). Each cam operates one or more microswitches which initiate the test cycle. These microswitches apply signals to the channel disconnect circuit shown generally in the test logic circuit 52, 52′ (FIG. 3) depending upon the position of switch 175.

Means are provided for disconnecting a detector channel from its output circuit and for connecting a test device thereto. This way, a blast simulating test signal can drive the detector through an exercise cycle without causing an output blast alarm. In greater detail, the channel disconnect circuitry may be a simple relay driver unit (FIG. 8) which comprises a four transistor flip-flop circuit 182. Diodes 183, 184 form a steering circuit which allows the flip-flop 182 to be triggered by only positive going signals. One such trigger signal comes from timer 180 and appears at terminal 178. Another such trigger signal comes from the fast trigger circuit 86 and is applied through capacitor 185. Resistor 94 prevents capacitor 95 from retaining a charge between test pulses. Resistors 186, 187, 188 reduce the voltage applied to transistor 189 to prevent overvoltage damage.

Figure 8:
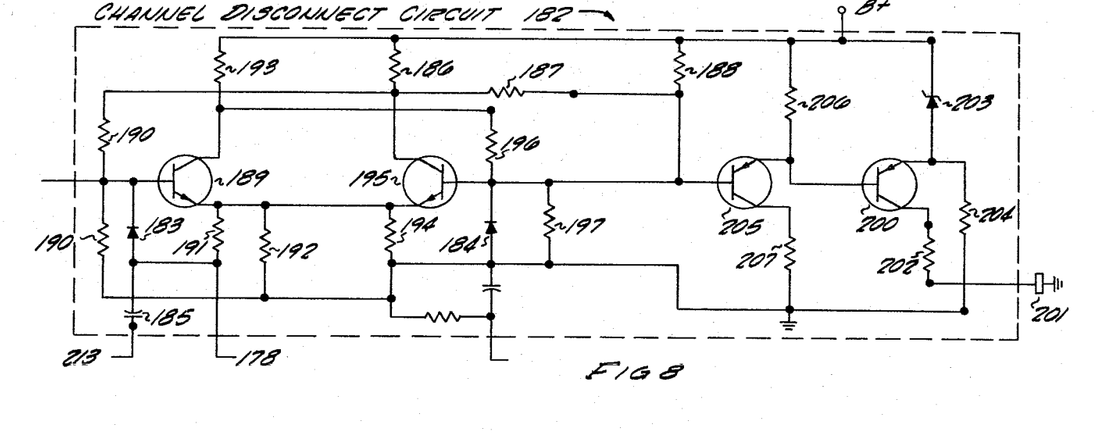
FIG. 8 is a schematic circuit diagram showing a channel disconnect circuit for use in a test circuit for the detector.

The remaining circuit components are: a base biasing voltage divider 190 for the NPN transistor 189, an emitter biasing voltage divider 191, 192, a load resistor 193, an emitter biasing resistor 194 for an NPN transistor 195, a base biasing voltage divider 196, 197, and the load resistor 186.

The current through an output transistor 200 controls the operation or release of a channel disconnect relay 201. Resistor 202 limits the voltage to prevent an overvoltage damage to the relay. A Zener diode 203 and resistor 204 control the voltage across transistor 200 so that it may be directly coupled to transistor 205, a current amplifier. Resistor 206 provides emitter bias for the PNP transistor 205 and base bias for the PNP transistor 200. Resistor 207 is a collector load for the transistor 205.

Figure 9:
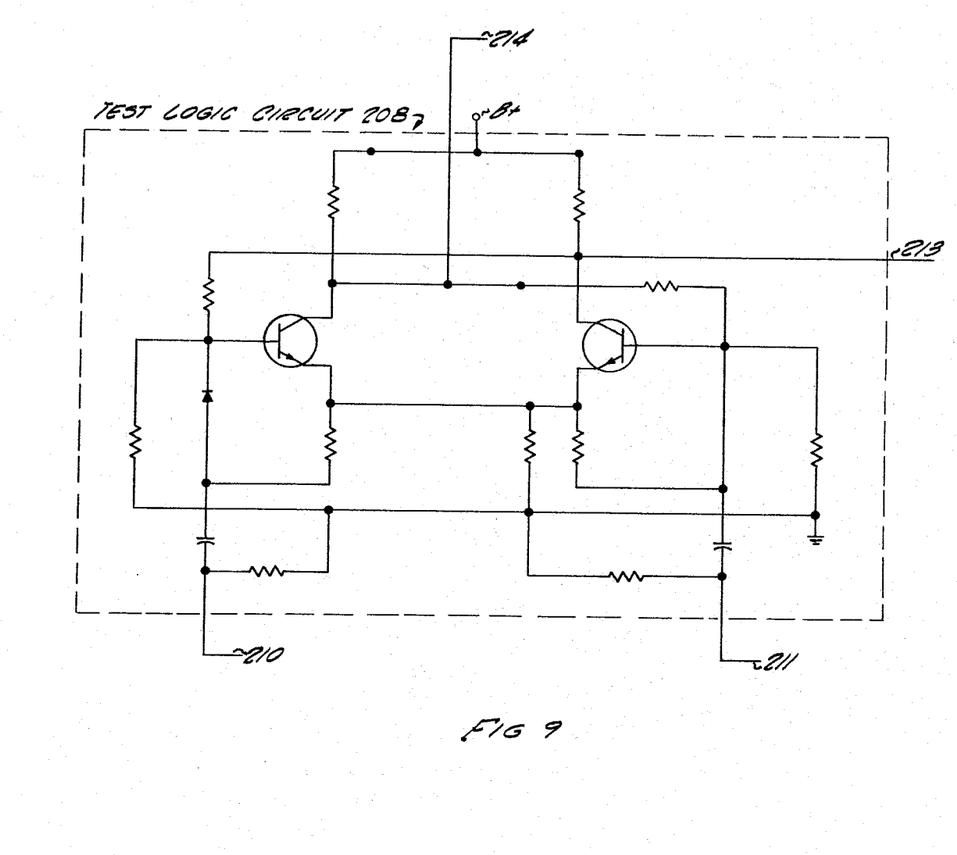
FIG. 9 is a schematic circuit diagram showing a second flip-flop circuit for use in the test circuit.

When a test is conducted, the channel disconnect circuit 182 is pulsed from the test logic circuit 208 as shown in FIG. 9. It includes two inputs 210, 211 selectively energized or de-energized from the fast or slow logic circuits 50, 51 depending upon the operation of contacts 212 of relay 201 (FIGS. 3 and 8). It also includes two outputs 213, 214 which connect to FIGS. 8 and 6 respectively. The circuitry of FIG. 9 is essentially the same as that shown in the left-hand dashed line rectangle of FIG. 6; therefore, no further detailed explanation is given at this time.

The operation depends upon whether the FIG. 9 flip-flop stands with an output on terminal 213, or 214. If the output terminal 214 is energized, an input of OR gate 107 (FIGS. 3, 6) is energized to enable the slow logic circuit so that a simulated blast signal may be detected. If the output terminal 213 is energized, the channel disconnect circuit of FIG. 8 is enabled, relay 201 operates, the output circuits 130, 131 are disconnected, and a test is conducted.

*Operation.*—With the foregoing description of components in mind, it is thought that the reader will better appreciate the invention from the following description of circuit operations. For this description reference is made to FIG. 3. Since those skilled in the art will also be able to easily understand the operation of the detailed circuits 4–9 from the following description of FIG. 3, no further reference will be made to those circuit details.

When the blast detector is first installed, the sensors 55, 55′ must be removed to a dry location, opened, inspected, cleaned and have a desiccant placed in the sensor housing 23. Since components age with use, the above process and various adjustments may be required at later periodic intervals. A need for these adjustments is indicated by a failure of the detector to pass either an automatic or manual test.

This adjustment of the detector should be made before any final sealing of the sensor and in the presence of bright noon-day sunlight. The procedure is to connect a D.C. voltmeter to the sensor output and make a "zero" adjustment. Then the sensor is covered by an opaque cloth or box. The reading of the voltmeter is observed. Next uncover the sensor and adjust a potentiometer associated with the photoelectric cell 22 for an output reading on the voltmeter approximately 5.0 volts (in one example) higher than the reading obtained with the sensor covered. After the sensor is adjusted, adjust the potentiometer 59 so that the output from the low pass filter 80 has the desired sensitivity. Thus, for example, the adjustment at 59 may cause a detection of a 20-kiloton blast (but not a 15-kiloton blast) at the range of 20 miles.

After all final adjustments are accomplished, the sensor and desiccate packets are placed inside the glass globe housing 23. Then the globe is secured to the base plate 20. Finally, using a good commercial grade, outside calking compound, a bead of calking is run around the junction between the glass globe and base plate. (This seal is to prevent moisture from entering the threads 27, 39 of the globe.)

Power is applied and, it is assumed that, relay 201′ operated; relay 201 is unoperated; channels 50–52 are operative; channels 50′–52′ are on standby.

*Blast detection.*—Assume that a nuclear blast of the required magnitude occurs within the detection range. The thermal signal is received by the optical sensor 55, transformed into an electrical signal by the photo-tube 22, and then sent on to the amplifier 57 via the cathode follower 40.

The signal is amplified by the amplifiers 57, 58 and then applied to the filter 80. The filter rejects very high frequency signals (such as a lightning caused sensor output) and also prevents unwanted very slow rise time signals (such as sun caused sensor outputs) from passing on.

Means are provided for causing an output responsive to either both nuclear caused thermal pulses, or responsive to the slow rising pulse alone. That is, both a fast and a slow signal of approximately 4 volts amplitude (in one installation) causes the Schmitt trigger circuit 86 to provide a positive pulse which is applied through the unoperated channel disconnect relay contacts 220 to the fast output circuitry 130. Contained in this fast output circuitry is the OR gate 132 which allows a signal from either channel 50 or channel 50′ to pass through. From the OR gate 132, the pulse is coupled to the flip-flop or bistable multivibrator 133, which directly controls the fast output relay 147. The relay is normally operated providing power to the load circuitry via contacts 169. The pulse from the fast Schmitt trigger 86 causes the flip-flop 133 to change state and the relay 147 releases.

From the flip-flop 133, the signal is also applied to the slow trigger logic 51 via the OR gate 107, and AND gate 108. The signal from filter 80 is also fed to the AND gate 108 where it coincides with the signal from signal flip-flop 133 applied through the OR circuit 107. The signal from the filter 80 must persist longer than approximately 50 ms. (in one example) before the circuit will allow the flip-flop 133' to be triggered.

Before the unijunction circuit 144 times out, or at the same time that the slow pulse occurs, the sensor 55 signal is also sent through AND gate 108 to another output circuit 131 which controls the release of relay 168. During the time when both relays 147, 168 are released, a signal is sent to the door closing device. The time factor can be adjusted from 1 to 3 seconds in one exemplary installation. After this time, the flip-flops 133, 133' automatically reset and the output relays 147, 168 again operate.

*Detector testing.*—A test sequence is initiated by either the automatic timer 180 or a manual test button 221. Operation of either applies a voltage spike to the flip-flop 182 which changes state. This change in state operates relay 201 and performs the following functions: (1) Disconnects the fast and slow output relays 147, 168 from the signal path to prevent them from being operated by the blast simulating test signal; (2) closes contacts 222 and switches the gain of the signal amplifiers to maximum; (3) applies voltage at contacts 223 to the test light 46 (FIG. 2 via conductor 224 FIG. 3) in the sensor 55; (4) connects the signal path at operated contacts 212, 224 to the test logic circuitry 52; and (5) removes voltage from the system normal lamp 226 and applies it to the Test-Fail lamp 227.

Simultaneously, the same automatically or manually applied signal releases relay 201' to place stand-by channel 49 in a condition to detect any blasts occurring while channel 48 is being tested.

Illumination of the test lamp 46 (via conductor 224) in the sensor 55 causes an output from the phototube 22 and a signal current flows through amplifier 56, filter 80, flip-flop 86, and flip-flop 106. The two inputs to the flip-flop 208 are the same as the two inputs to relays 147, 168. This flip-flop is normally set so that the side connected to flip-flop 182 is "off." The application of the signal from flip-flop 86 causes the flip-flop 208 to change state. The normally "on" side "+" of the flip-flop is now switched "off" and the other "1" side sends a positive signal to the OR gate 107 and on to the AND gate 108. Operation of this circuitry is the same as the operation caused by a blast signal. The output from flip-flop 106 is applied through the operated channel disconnect relay contacts 225 to flip-flop 208 which again changes state (back to its normal condition). The side connected to flip-flop 182 is switched "on" and a voltage is removed from relay 201 to return the channel to normal operating conditions.

If, due to some malfunction, a correct "normal" output from either of the flip-flops 133, 182 does not occur, the channel disconnect relay 201 does not return to normal and the test failure lamp 227 remains illuminated. Obviously any other convenient alarm may also be given.

*Reset.*—If the channel disconnect control flip-flop 182 must be returned to normal either because a failure has occurred (and been corrected) or if an initial turn "on" voltage surges caused the flip-flops to be in the wrong state, the "Reset" switch 230 is pushed to apply a voltage to the flip-flop 182' in channel 49 to return it to normal state. To return the test logic to the proper state for normal operation, operate switch 221 and perform a test sequence.

Among the many advantages of this system are a quick response to the first, fast rise time, blast caused thermal pulse with a back-up response to the second, slow rise time, blast caused, thermal pulse. Moreover, the timer 180 automatically tests the detector at frequent intervals. In fact, the test intervals may be so frequent that there is a virtually constant surveillance over the detector. Also, the redundancy transfer between channels during testing precludes unguarded intervals when detection is not possible. This way, the system becomes almost foolproof. Still other advantages will occur to those skilled in the art.

RADIATION DETECTOR

A second embodiment of the invention (FIG. 10) detects electromagnetic radio waves, another of the many forms of energy that is released upon the occurrence of a nuclear blast. This energy is propagated outwardly from the explosion in the same manner as the signal from an omnidirectional radio antenna is propagated. Therefore, this embodiment of the invention is designed to intercept the radio signal and produce an output signal that can be used to initiate the desired protective measures, such as the closure of fall-out shelter doors. While the drawing of embodiment only shows one test and one detector channel, it should be understood that the redundancy and transfer principle of FIG. 3 apply to the embodiment of FIG. 10 also.

Before presenting details about the radiation detector structure, it may be well to here note a few design considerations. The entire atomic age goes back only a few years. Thus, many of the details concerning energy propagation that are used in the invention may be refined later, as more test data become available. However, it is thought that the principles of the energy propagation will not change, and therefore, the scope of the invention should be construed broadly.

Perhaps a specific illustration will clarify the matter. According to this illustration the wave form of radio energy radiating from a nuclear blast is viewed as a binary coded signal with respect to some reference potential. Thus, it might be convenient to think of a negative going half-cycle as a binary "1," for example. If a negative half-cycle (with respect to the particular reference potential) is "1," the next positive going half-cycle might be considered as a binary "0." Perhaps the binary code characteristic of nuclear blast radiations might be thought of today as "010" (with respect to the reference). In a few years, we may known that, for some blasts, the code really is some other code, such as "100" (with respect to the reference).

Of course the present day electronic logic circuits are well adapted to detect and respond to any desired binary code. Moreover, the expression "binary code" has been adopted solely as a convenience of expression since binary coding appears to offer an apt analogy; perhaps "crutucak wave" form might be a more truly descriptive term. Thus, the invention should not be construed as limited to any particular code or wave form. Quite the contrary, the invention should be construed to cover means for detecting any "code conditions" resulting from a blast caused wave form.

Figures 10, 12:
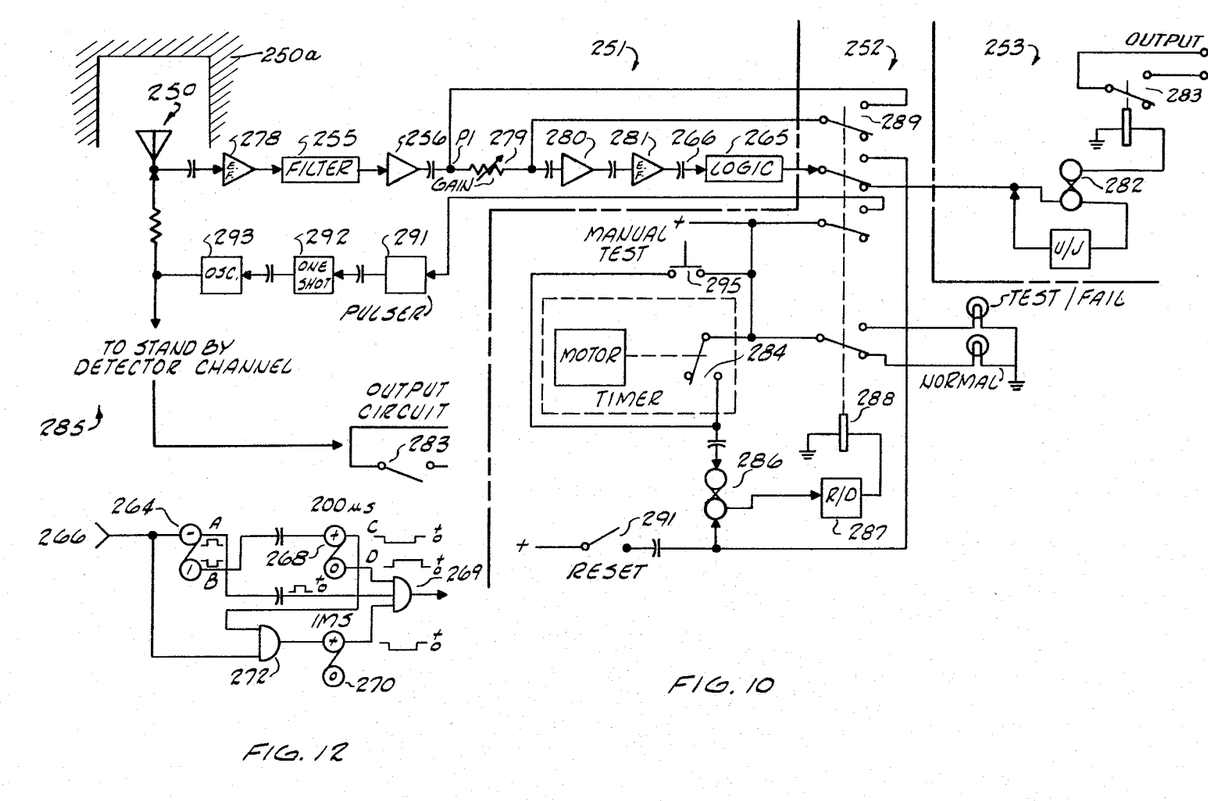
FIG. 10 is a schematic circuit diagram showing a second embodiment of the invention for detecting radiant energy.
FIG. 12 illustrates how bistable circuits are designed to analyze the monocycle wave form.

As shown in FIG. 10, this blast detector includes an antenna 250, electronic logic circuitry 251, a test circuit 252, and an output circuit 253. The antenna 250 should be hardened or blast resistant such as by being enclosed in a concrete shelter symbolically shown as shelter 250a and located in an unobstructed outdoor area. The circuitry 251 contains the necessary electronic equipment; however, no effort is made to show the details of such equipment since it is thought that those skilled in the art will readily perceive such details from the foregoing description of FIGS. 3–9.

The antenna 250 is hardened and comprises a vertical stub designed to withstand 50 pounds per square inch over pressure, such as a length of schedule #80, ten-inch diameter, wrought steel pipe, for example. This pipe is preferably set into a concrete pedestal which is mounted flush with the ground level. An access port is provided in the pedestal in which connections to the antenna are made and where a lightning protection device is also located. The signal is carried from the antenna to the controller via a coaxial cable. This signal (which is the critical wave form) is here shown by arbitrarily drawn wave form of one cycle duration of approximately 100 microseconds as shown at 254 in FIG. 11. All other signals are unwanted.

Means are provided for preventing most of these unwanted signals from causing an output. In greater detail, filter 255 contained in the amplifier section of the electronic system causes only the wanted input signal (the uppermost wave form in FIG. 11) to appear at the output of the amplifier 256. The amplifier 256 design is such that the initial negative sense pulse 254 of the input signal results in a negative output pulse 257 (FIG. 11) at point P1. However, the following positive sense of pulse 258 of the input signal results in both positive and negative sense output pulses 259, 260. In other words, an input signal of a negative sense followed by an input signal of a positive sense results, at the output point P1, in two negative output pulses 257, 260 separated by a pulse of a positive sense. (Conversely, if the uppermost wave form of FIG. 11 should be inverted from that shown, an input signal with a positive sense followed by a signal with a negative sense results in two positive pulses and a negative pulse at the output.) Other critical wave forms are treated similarly.

Even if a single negative signal is received, no output signal occurs unless another negative signal is received within 200 μsec. after the trailing edge of the first negative signal. More particularly, the signal 257, 259, 260 of FIGURE 11 is applied to a Schmitt trigger circuit 264 as shown in FIG. 12 (the circuitry for the logic block 265 of FIG. 10). This Schmitt trigger circuit triggers only if the signal applied at 266 is below a predetermined zero reference level, i.e., has a negative sense with respect to "zero." Thus, when such a negative signal occurs the Schmitt trigger circuit 264 produces a signal as shown at A and B and on FIG. 11. Thereafter, a 200 μs. one-shot multivibrator 268 is triggered from the trailing edge of the initial output of the Schmitt trigger circuit (as shown at C, D, and on FIG. 11). The "A" signal of the Schmitt trigger and the "D" signal from the 200 μs. one-shot multivibrator 268 are applied to the input of an AND gate 269. Also applied to this AND gate 269 is the output from a 1 ms. one-shot multivibrator 270. The amplifier 256 signal and the "C" output from the 200 μs. one-shot multivibrator 268 are applied to an AND gate 272. There is no output from AND gate 272 under these conditions (negative input pulse); therefore, the output of the 1 ms. multivibrator 270 is a continuous "1." When the next negative input signal appears at terminal 266 and the 200 μs. multivibrator 268 combine to provide a "1" to AND gate 269, an output signal is as shown at 274 in FIG. 11.

Means are provided for rejecting unwanted or incorrect signals. For the purpose of this description only, it is assumed that an incorrect signal has a positive initial sense for pulse 254. This means that, for an incorrect signal, the critical wave form shown in the uppermost curve of FIG. 11 is inverted. Thus, the initial positive signal passes through AND gate 272 (remember this gate does not conduct negative input pulses) and cause the 1 ms. multivibrator 270 to change state, thereby removing the enabling signal from the AND gate 269. Under these conditions, no signal can pass through AND gate 269 until the end of the 1 ms. period. Hence, it is seen that if a signal pulse of positive sense is received, essentially the same sequence as a correct pulse occurs except that the output of the 1 ms. multivibrator 270 is inhibited.

The circuit (FIG. 10) operates this way. Responsive to the correct negative going pulse 254, a signal is passed through the emitter follow 278 for impedance transformation. It is then passed through the filter 255 to eliminate very low frequencies. Next, the signal is amplified, passed through a gain or sensitivity control potentiometer 279 and further amplified at 280. Another emitter follower 281 is used at the output of the amplifier 280 to prevent a loading of the amplifier 280 by the logic circuitry 265. The signal is then passed through the logic circuitry 265 (FIG. 12) as described above. An output signal from the logic circuitry 265 is applied to an output flip-flop circuit 282 (essentially the same as FIG. 7) through a set of channel disconnect relay contacts. In the normal operating position, these contacts allow the signal to trigger the flip-flop 282, thereby closing the contacts 283 of the output relay. The length of time that the output relay remains closed is controlled by a unijunction circuit which automatically resets the flip-flop as described above in connection with the circuit 133, 144.

A test function circuit is also contained within this radiation detection system. More particularly, a D.C. motor, rotating a cam closes contacts 284 periodically, such as once per hour, causes automatic testing. As with the FIG. 3 embodiment, items 278, 255, 256, 279, 280, 281, 266, 265 may be duplicated at 285 to detect blasts while the channel shown is being tested.

Once each hour, the voltage of a power supply is applied to a test flip-flop 286 through the timer switch contacts 284. The application of this voltage causes the flip-flop 286 to change states. This change in state pulses a relay driver circuit 287 and causes a test relay 288 to be energized. When energized relay 288 closes contacts 289 and causes the gain of the amplifiers 256, 280 to be switched to a maximum. The logic circuit 265 output is transferred to the test flip-flop 286 and the system status indicators (lamps NORMAL and TEST/FAIL) change from normal to test. Then, the supply voltage is applied to a unijunction pulser 291 which is similar to circuit 144.

The unijunction pulser 291 generates a single pulse approximately 300 ms. after initiation of the test cycle. The main purpose of the delay is to allow all relay contact bounce to die out and further to allow the TEST/FAIL indication lamp to be illuminated long enough to reach a maximum brilliance. The output of the pulser 291 also causes a 100 μsec. one-shot multivibrator 292 to produce a pulse which is coupled to a monocycle oscillator 293. One cycle of a 10 kc. wave form is produced with the correct blast simulating critical wave form and polarity sense. This wave form is applied to the input of the emitter follower 278 at the antenna terminals. The oscillator signal is then processed through the electronic detector system as an actual signal blast caused signal would be processed. The output from the logic circuit 265 causes the test flip-flop 286 to return to its normal state which in turn releases relay 288 and returns the system to normal operation.

If for any reason a successful test cycle is not completed, the relay 288 remains operated and TEST/FAIL lamp remains illuminated because the test flip-flop 286 does not return to its normal state. Obviously any other suitable failure alarm may be given also.

A reset feature is provided at switch 291 to trigger the test flip-flop 286 if it remains in the test position when power is first applied to the equipment. Also, if a failure occurs and the TEST/FAIL lamp remains illuminated, the test flip-flop can be reset manually from switch 291 for further testing.

Manual testing can be accomplished in an obvious manner by operation of the manual test switch 295.

While the principles of the invention have been described above in connection with specific apparatus and applications, it is to be understood that this description is made only by way of example and not as a limitation on the scope of the invention.

We claim:
1. An electronic detector comprising means including at least one channel of electronic logic circuitry for detecting radio waves radiating from a nuclear blast, a hardened antenna, means coupled to an input end of said channel for receiving and sensing said radiant energy, electronic logic means comprising at least two bistable circuits coupled to an output end of said channel for giving an output signal responsive to a detection at said antenna of two half-cycle wave forms of predetermined polarity sense occurring within intervals measured by the timing of said bistable circuits.

2. The detector of claim 1 and means for testing said detector periodically, said tester comprising timer means for initiating a series of events, means whereby one of said events causes a disconnection of said output circuit means from the output end of said channel so that other circuits are not activated by the testing means, means whereby another of said events causes a blast simulating signal to be applied to an input of said channel, test logic circuit means, means whereby another of said events causes said test logic means to detect the presence of said blast simulating test signal applied to said input end, means for determining whether all of the necessary functions are correctly performed in said one channel when said test signal occurs, and means for giving an alarm signal if all said necessary functions are not performed.

3. An explosion detector for detecting blasts characterized by radio wave energy radiated in an effectively binary coded wave form, a hardened antenna for detecting said radiated energy, electronic circuit means coupled to said antenna for analyzing said detected energy, and means for giving an output signal if said analyzed energy coincides with said binary code.

4. An electronic detector comprising means including at least one channel of electronic logic circuitry for detecting electromagnetic energy radiating from a nuclear blast, receiving means coupled to an input in said channel for receiving and sensing said radiant energy, electronic logic means comprising at least two bi-stable circuits coupled to an output end of said channel for giving an output signal responsive to a detection by said receiving means of two half-cycle wave forms of predetermined polarity sense occurring within intervals measured by the timing of said bistable circuits.

5. The detector of claim 4 and means for testing said detector periodically, said tester comprising timer means for initiating a series of events, means whereby one of said events causes a disconnection of said output circuit means from the output end of said channel so that other circuits are not activated by the testing means, means whereby another of said events causes a blast simulating signal to be applied to an input of said channel, test logic circuit means, means whereby another of said events causes said test logic means to detect the presence of said blast simulating test signal applied to said input end, means for determining whether all of the necessary functions are correctly performed in said one channel when said test signal occurs, and means for giving an alarm signal if all said necessary functions are not performed.

References Cited by the Examiner

UNITED STATES PATENTS

| | | | |
|---|---|---|---|
| 2,752,593 | 6/1956 | Downs | 234—68 X |
| 2,984,746 | 5/1961 | Speh | 250—83 X |
| 3,010,098 | 11/1961 | Pomeroy | 340—224 |
| 3,147,380 | 9/1964 | Buckingham et al. | 250—83.3 |

OTHER REFERENCES

Nuclear Bomb Alarm Systems, by Champeny et al., from Electronics, vol. 32, No. 19, May 8, 1959, pp. 53–55.

RALPH G. NILSON, *Primary Examiner.*

ARCHIE R. BORCHELT, *Examiner.*